United States Patent Office 3,394,121
Patented July 23, 1968

3,394,121
AZO DYES CONTAINING AN IMIDOETHYL-SULFONYLETHYL GROUP
Max A. Weaver and John I. Dale III, Kingsport, Tenn., assignors to Eastman Kodak Company, Rochester, N.Y., a corporation of New Jersey
No Drawing. Filed Oct. 22, 1965, Ser. No. 502,430
9 Claims. (Cl. 260—152)

ABSTRACT OF THE DISCLOSURE

Phenyl-azo-aniline compounds containing a dicarboximidoalkylsulfonylalkyl group attached to the aniline nitrogen atom are useful as dyes for hydrophobic textile materials.

---

This invention relates to novel water insoluble azo compounds and, more particularly, to azo compounds, such as azo dyes, containing an imidoethylsulfonylethyl group.

The azo dyes of the invention are characterized by the general formula $$R-N=N-R^1-N\begin{matrix}R^2\\C_2H_4SO_2C_2H_4-R^3\end{matrix} \quad (I)$$

wherein R represents a monocyclic carbocyclic aromatic radical of the benzene series, e.g., phenyl and substituted phenyl having the formula

[structure with $X_{(n)}$ substituent on benzene ring]

wherein X may be lower alkyl, e.g., methyl; lower alkoxyl, e.g., methoxyl; halogeno, e.g., chlorine; nitro; lower alkylsulfonyl, e.g., methylsulfonyl; lower alkylsulfonamido, e.g., methylsulfonamido; dicarboxylic acid imido, e.g., succinimido; lower fluoroalkyl, e.g., trifluoromethyl; lower alkanoylamino, e.g., acetamido; cyano; carbamoyl; benzamido; thiocyano; lower alkylthio, e.g., methylthio; benzoxy; benzamino; benzylamino; N-alkylbenzamino, e.g., N-phenylmethylamino; formyl; lower carbalkoxy, e.g., carbethoxy; benzoyl and the like and (n) may be 0, 1, 2 or 3;

$R^1$ represents a monocyclic carbocyclic aromatic radical of the benzene series, e.g., phenylene and substituted phenylene having the formula

[structure with $Y_{(m)}$ substituent on benzene ring]

wherein Y may be lower alkyl, e.g., methyl; lower alkoxyl, e.g., methoxyl; halo, e.g., chloro; alkylsulfonyl, e.g., methylsulfonyl; lower alkylsulfonamido, e.g., methylsulfonamido; dicarboxylic acid imido, e.g., succinimido; lower alkanoylamino, e.g., acetamido; benzamido; thiocyano; lower alkylthio, e.g., methylthio; benzoxyl; benzamino; benzylamino; N-alkylbenzylamino, e.g., N-phenylmethylamino; carbalkoxy, e.g., carbethoxy; benzoyl and the like and (m) may be 0, 1 or 2;

$R^2$ represents hydrogen or an alkyl radical including unsubstituted alkyl, preferably lower alkyl, e.g., from 1 to 4 carbon atoms, and substituted alkyl such as hydroxyalkyl, e.g., hydroxyethyl; polyhydroxyalkyl, e.g., 2,3-dihydroxypropyl; lower alkoxyalkyl, e.g., methoxyethyl; cyanoalkyl, e.g., cyanoethyl; cyanoalkoxyalkyl, e.g., β-cyanoethoxyethyl; lower alkanoyloxy alkyl, e.g., acetoxyethyl; lower carbalkoxyalkyl, e.g., carbethoxyethyl; halogenoalkyl, e.g., chloroethyl; hydroxyhalogenoalkyl, e.g., β-hydroxy-α-chloropropyl; lower alkylsulfonylalkyl, e.g., methylsulfonylethyl; lower alkyl-OCOOCH$_2$CH$_2$—, e.g., CH$_3$OCOOCH$_2$CH$_2$; carbamoylalkyl, e.g., carbamoylethyl; lower alkylcarbamoylalkyl, e.g., ethylcarbamoylethyl benzyl, phenoxyalkyl, e.g., β-phenoxyethyl; lower alkylsulfonamidoalkyl, e.g., methylsulfonamidoethyl; dicarboximidoalkyl, e.g., β-dicarboximidoethyl, etc. or $R^2$ represents a monocyclic carbocyclic aromatic radical of the benzene series, e.g., unsubstituted phenyl and substituted phenyl such as represented by $R^1$ above e.g., lower alkylphenyl, lower alkoxyphenyl, halophenyl, etc. A preferred group represented by $R^2$ includes hydrogen, alkyl, alkoxyalkyl, phenoxyalkyl, alkanoyloxyalkyl, haloalkyl, hydroxyalkyl, carbethoxyalkyl or cyanoalkyl, the alkyl groups of which are lower alkyl. As can be seen from the examples given below, the substituents attached to the R, $R^1$ and $R^2$ groups serve primarily as auxochrome groups to control the color of the azo compound.

$R^3$ represents a dicarboximido radical, e.g., a radical having the formula $$-N\begin{matrix}CO\\ \\CO\end{matrix}Z$$

wherein Z represents a substituted or nonsubstituted hydrocarbon radical or group of carbon atoms necessary to complete the cyclic imide, such as alkylene $$(-CH_2CH_2-)$$

vinylene (—CH=CH—); o-phenylene, e.g.,

[o-phenylene ring structure]

hydroxyalkylene; lower alkanoyloxyalkylene, e.g., acetoxyethylene; cycloalkylene, e.g., hexamethylene; cyanoalkylene, e.g., cyanoethylene; haloalkylene, e.g., chloroethylene and the like.

The novel azo dyes of the invention, characterized by Formula I above, are prepared by coupling a conventional diazonium salt of a compound having the formula $$R-NH_2 \quad (II)$$

with a coupling component having the formula $$R^1-N\begin{matrix}R^2\\C_2H_4SO_2C_2H_4-R^3\end{matrix} \quad (III)$$

wherein R, $R^1$, $R^2$ and $R^3$ are defined above.

Thus, the schematic reaction is illustrated as follows:

$$R-NH_2 \xrightarrow{\text{diazotization}} \text{diazonium salt}$$
(II)

$$+$$

$$R^1-N\begin{matrix}R^2\\C_2H_4SO_2C_2H_4-R^3\end{matrix}$$
(III)

↓

$$R-N=N-R^1-N\begin{matrix}R^2\\C_2H_4SO_2C_2H_4-R^3\end{matrix}$$
(I)

The coupling components, represented by Formula III above, are prepared by the reaction of an alkyl- or aryl-dicarboximide with a vinylsulfonylethylaniline derivative, the reaction being schematically illustrated as follows:

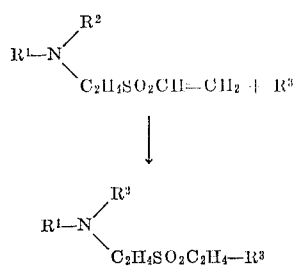

wherein R, R¹, R² and R³ are defined above.

The preparation of the coupling components and the dyes produced therefrom will be more fully illustrated by the following examples.

EXAMPLE 1

(a) Preparation of the coupler.—One ml. of 40% aqueous Triton B was added to a stirred slurry of 7.35 g. phthalimide, 0.5 g. hydroquinone and 25 ml. dioxane. A solution of 12.65 g. of N-β-vinylsulfonylethyl-N-ethyl-m-toluidine (prepared by the reaction of N-ethyl-m-toluidine with divinylsulfone in acetic acid) in 15 ml. dioxane was added dropwise during 15 minutes. The reaction mixture was stirred and heated at reflux for 2½ hours then drowned in water. The solid which formed was crystallized from ethanol. It melts 117–118°.

*Analysis.*—Calcd.: C, 63.0; H, 6.0; N, 7.0. Found: C, 63.19; H, 6.06; N, 6.80.

It has the structure:

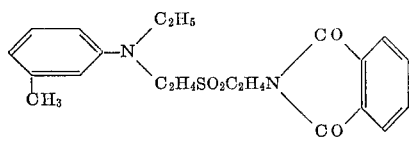

(b) Preparation of the dye.—An amount of 6.9 g. p-nitroaniline was dissolved in 5.4 ml. conc. sulfuric acid and 12.6 ml. $H_2O$. This solution was poured onto 50 g. of ice and then a solution of 3.6 g. sodium nitrite in 8 ml. of water was added all at once. The diazotization was stirred at 5° for 1 hour, resulting in almost complete solution. After filtration, the diazonium solution was added to a chilled solution of 20.0 g. of the coupler prepared in (a) above, in 100 ml. 1:5 acid (1 part propionic acid:5 parts acetic acid). The coupling was neutralized with solid ammonium acetate to brown on Congo red paper and allowed to couple 1 hour. It was drowned in water, filtered, washed and dried. The product dyes polyester and cellulose acetate fibers bright orange shade with excellent fastness to light and sublimation. It has the structure:

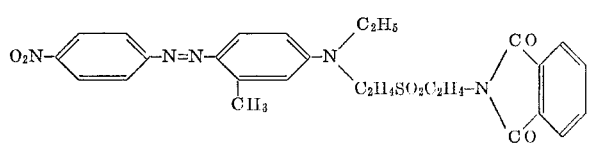

All of the couplers were prepared in accordance with the procedure of Example 1 with substitution of appropriate alkyl- or aryl-dicarboximide and vinylsulfonylethylaniline compounds.

EXAMPLE 2

An amount of 6.9 g. p-nitroaniline was diazotized as in Example 1 (b). This diazonium solution was added to a chilled solution of 22.2 g. of N-β-acetoxyethyl-N-[2-(2-phthalimidoethylsulfonyl)ethyl]aniline in 150 ml. of 1:5 acid. This was neutralized with solid ammonium acetate to brown on Congo red paper and allowed to couple 2 hours, all at 5–10° C. The reaction was then drowned with water and the product collected by filtration, washed with water, and air dried. It dyes polyester fibers bright shades of orange with excellent fastness properties. It has the structure:

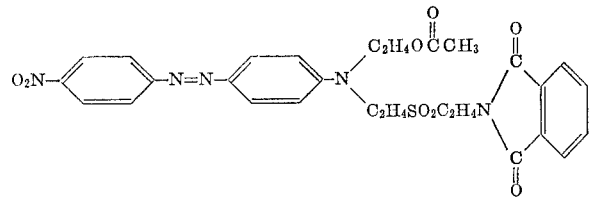

EXAMPLE 3

A solution of 0.72 g. dry $NaNO_2$ in 5 ml. conc. $H_2SO_4$ was cooled in an ice bath, and 10 ml. 1:5 acid was added below 15° C. This solution was stirred at 5° C. and 1.72 g. of 2-chloro-4-nitroaniline was added, followed by 10 ml. 1:5 acid. The diazotization was stirred 2 hr. at 0–5°° C., then added to a chilled solution of 4.0 g. of N-ethyl-N-[2-(2-phthalimidoethylsulfonyl)ethyl]m-toluidine in 25 ml. 1:5 acid. This coupling was kept at below 10° C. and neutralized to brown on Congo red paper by the addition of solid ammonium acetate. After coupling 2 hr., the mixture was drowned in water, filtered, washed with water and dried at room temperature. The product dyes polyester fibers a deep shade of red with good fastness properties. It has the structure:

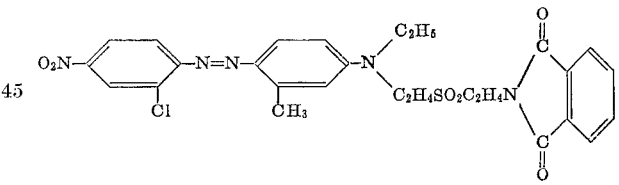

EXAMPLE 4

An amount of 6.9 g. 2,6-dichloro-4-nitroaniline was dissolved in 37.5 ml. conc. $H_2SO_4$ at about 25° C. The solution was chilled and a solution of 2.2 g. $NaNO_2$ in 15 ml. conc. $H_2SO_4$ added below 5° C. The diazotization was stirred at 0–5° C. for 2 hr. then added to a chilled solution of 10.5 g. of N-ethyl-N-[2-(2-succinimidoethylsulfonyl)ethyl]-m-toluidine in 150 ml. of 15% $H_2SO_4$. The coupling was neutralized to brown on Congo red paper, keeping the temperature below 10° C., by the addition of solid ammonium acetate. After coupling 2 hr., the mixture was drowned with water, filtered, washed with water, and air dried. The product dyes polyester fibers a desirable shade of brown having excellent fastness properties. It has the structure:

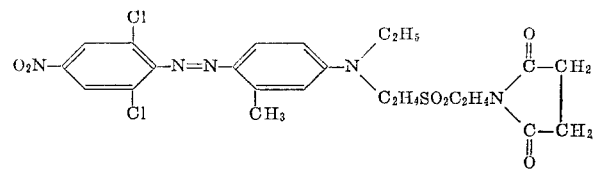

EXAMPLE 5

Example 4 was repeated, substituting 12.0 g. of N-ethyl-N - [2 - (2 - phthalimidoethylsulfonyl)ethyl] - m - toluidine as the coupler. The dye imparts brown shades to polyester fibers and has the structure:

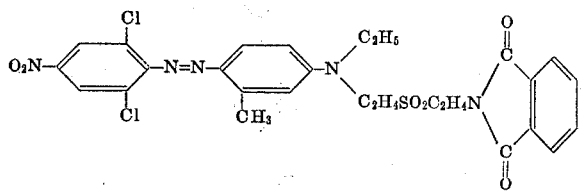

EXAMPLE 6

An amount of 0.72 g. dry NaNO$_2$ was added portionwise to 5 ml. conc. H$_2$SO$_4$ and the solution cooled. To this was added 10 ml. 1:5 acid followed by 2.16 g. 2-methylsulfonyl-4-nitroaniline and 10 ml. more 1:5 acid, all at 0–5° C. The diazotization was stirred at 0–5° C. for 3 hr. and then added to a chilled solution of 4.0 g. of N - ethyl - N - [2 - (2 - phthalimidoethylsulfonyl)ethyl]-m-toluidine in 50 ml. 1:5 acid. The coupling was neutralized with solid ammonium acetate to brown on Congo red paper, at less than 10° C. After coupling 2 hr., the mixture was drowned with water, filtered, washed, and air dried. The product dyes polyester fibers a pink shade with excellent light and sublimation fastness. It has the structure:

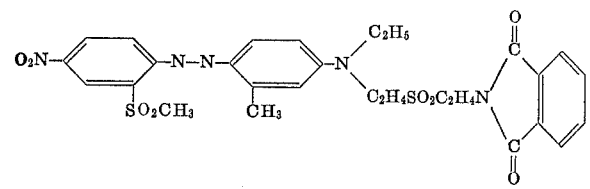

In accordance with Examples 1 through 6, additional dyes were prepared corresponding to the formula

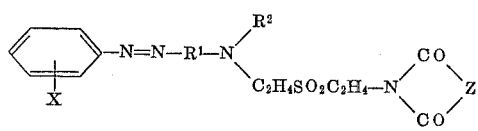

wherein X, R$^1$, R$^2$ and Z are set forth in the following table:

TABLE

| Example No. | X | R$^1$ | R$^2$ | Z | Color |
|---|---|---|---|---|---|
| 7 | p-NO$_2$ | m-Tolylene | —C$_2$H$_5$ | —(phenyl) | Orange. |
| 8 | p-NO$_2$ | do | —C$_2$H$_4$CN | —CH$_2$—CH$_2$ | Do. |
| 9 | p-NO$_2$ | do | —CH$_2$CH$_2$Cl | >(CH$_2$)$_3$ | Do. |
| 10 | p-NO$_2$ | do | —CH$_2$CH$_2$OCH$_3$ | —CHOH—CH$_2$ | Do. |
| 11 | p-NO$_2$ | do | —CH$_2$CH$_2$OCOCH$_3$ | —CHOCOCH$_3$—CH$_2$ | Do. |
| 12 | p-NO$_2$ | do | —CH$_2$CH$_2$N(COCH$_2$)(COCH$_2$) | —CH$_2$—(phenyl) | Do. |
| 13 | p-NO$_2$ | do | —CH$_2$CH$_2$CO$_2$C$_2$H$_5$ | (cyclopentyl) | Do. |
| 14 | p-NO$_2$ | do | —CH$_2$CH$_2$Br | (cyclohexyl) | Do. |
| 15 | p-NO$_2$ | do | —CH$_2$CH$_2$SO$_2$CH$_3$ | —CHCH$_3$—CHCH$_3$ | Do. |
| 16 | p-NO$_2$ | do | —CH$_2$CH$_2$CONH$_2$ | —CHCl—CH$_2$ | Do. |
| 17 | p-NO$_2$ | do | —CH$_2$CH$_2$N(CO)(CO)(phenyl) | >CH$_2$—CHCH$_3$ | Do. |
| 18 | p-NO$_2$ | do | —CH$_2$CH$_2$OCONH(phenyl) | >CH$_2$—CHCN | Do. |
| 19 | 2-NO$_2$-4-Cl | do | —C$_2$H$_5$ | —(phenyl) | Red. |

TABLE—Continued

| Example No. | X | R¹ | R² | Z | Color |
|---|---|---|---|---|---|
| 20 | 2-NO$_2$-4-Cl | m-Tolylene | —CH$_2$CH$_2$OH |  | Scarlet. |
| 21 | 2-NO$_2$-4-Cl | Phenylene | —CH$_2$CH$_2$Cl | 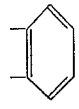 | Do. |
| 22 | 4-NO$_2$-2-Cl | m-Tolylene | —CH$_2$CH$_2$N(COCH$_2$)(COCH$_2$) |  | Do. |
| 23 | 4-NO$_2$-2-Cl | Phenylene | —C$_2$H$_5$ |  | Do. |
| 24 | 2,6-di-Cl-4-NO$_2$ | m-Tolylene | —C$_2$H$_5$ | 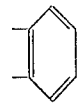 | Yellow-brown. |
| 25 | 2,6-di-Cl-4-NO$_2$ | ....do.... | —C$_2$H$_4$OH |  | Do. |
| 26 | 2-CH$_3$SO$_2$-4-NO$_2$ | ....do.... | —C$_2$H$_5$ |  | Red-violet. |
| 27 | 2-CH$_3$SO$_2$-4-NO$_2$ | ....do.... | —C$_2$H$_4$Cl |  | Do. |
| 28 | None | ....do.... | —C$_2$H$_5$ |  | Yellow. |
| 29 | ....do.... | Phenylene | —CH$_2$CH$_2$OH | 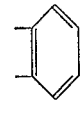 | Do. |
| 30 | ....do.... | ....do.... | —CH$_2$CH$_2$Cl |  | Do. |
| 31 | p-CH$_3$SO$_2$ | m-Tolylene | —C$_2$H$_5$ |  | Orange. |
| 32 | p-CH$_3$SO$_2$ | ....do.... | —CH$_2$CH$_2$Cl | 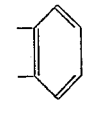 | Yellow-orange. |
| 33 | p-CH$_3$SO$_2$ | o-Tolylene | —H |  | Yellow. |
| 34 | p-CH$_3$CO | m-Tolylene | —C$_2$H$_5$ |  | Do. |

TABLE—Continued

| Example No. | X | R¹ | R² | Z | Color |
|---|---|---|---|---|---|
| 35 | p-Cl | m-Tolylene | —CH₂CH₂OH |  | Yellow. |
| 36 | p-Cl | ....do.... | —CH₂CH₂N(COCH₃)(COCH₃) |  | Do. |
| 37 | p-Cl | ....do.... | —CH₂CH₂OCONH—C₆H₅ |  | Do. |
| 38 | p-CN | ....do.... | —C₂H₅ |  | Do. |
| 39 | p-NO₂ | m-Chlorophenylene | —C₂H₅ |  | Do. |
| 40 | p-NO₂ | o-Chlorophenylene | —H |  | Do. |
| 41 | 2,4-di-CH₃SO₂ | m-Tolylene | —C₂H₅ | 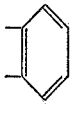 | Red. |
| 42 | 2,4-di-CH₃SO₂ | ....do.... | —CH₂CH₂OH |  | Red. |
| 43 | 2,4-di-CH₃SO₂ | ....do.... | —CH₂CH₂OCONH—C₆H₅ |  | Red. |
| 44 | 2,4-di-CH₃SO₂ | ....do.... | —CH₂CH₂N(COCH₃)(COCH₃) |  | Red. |
| 45 | 2,4-di-CH₃SO₂ | Phenylene | —C₂H₅ |  | Red. |
| 46 | 2,4-di-CH₃SO₂ | o-Tolylene | —H |  | Red. |
| 47 | p-CH₃ | m-Tolylene | —C₂H₅ |  | Yellow. |
| 48 | p-CH₃ | ....do.... | —C₂H₄Cl |  | Do. |
| 49 | p-CH₃ | Phenylene | —C₂H₄OH |  | Do. |

TABLE—Continued

| Example No. | X | R¹ | R² | Z | Color |
|---|---|---|---|---|---|
| 50 | p-SO₂NH₂ | Phenylene | —C₂H₅ |  | Red. |
| 51 | p-SO₂NH₂ | m-Tolylene | —C₂H₅ |  | Red. |
| 52 | p-CF₃ | ....do.... | —C₂H₅ |  | Yellow. |
| 53 | p-NO₂ | 2-OCH₃-5-methylphenylene | —C₂H₅ |  | Violet. |
| 54 | p-NO₂ | ....do.... | —C₂H₄OH |  | Do. |
| 55 | p-NO₂ | 2-OCH₃-5-NHCOCH₃ phenylene | —C₂H₅ |  | Do. |
| 56 | p-SO₂N(CH₃)₂ | m-Tolylene | —C₂H₅ |  | Red. |
| 57 | 2,4-di-NO₂-6-Cl | ....do.... | —C₂H₅ |  | Violet. |
| 58 | 4-CH₃SO₂-2-Cl | ....do.... | —C₂H₅ |  | Orange-yellow. |
| 59 | 4-CH₃SO₂-2-Cl | ....do.... | —CH₂CH₂OH |  | Do. |
| 60 | 4-CH₃CO-2-Cl | ....do.... | —C₂H₅ |  | Do. |
| 61 | 4-CHO | ....do.... | —C₂H₅ |  | Orange. |
| 62 | 4-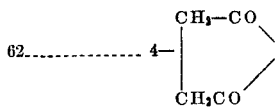 | ....do.... | —C₂H₅ |  | Yellow. |
| 63 | p-NO₂ | Phenylene | —C₂H₄OCCH₃ (O) |  | Orange. |
| 64 | 2,6-dichloro-4-NO₂ | m-Tolylene | —C₂H₅ | —CH₂<br>—CH₂ | Brown. |

The azo compounds of the invention can be used for dyeing textile materials including protein and synthetic polymer fibers, yarns and fabrics giving a variety of fast brilliant violet to yellow shades, including red, orange, yellow, brown and violet when applied thereto by conventional dye methods. The azo compounds have good affinity for cellulose ester and polyamide fibers. When the azo compounds are used for dyeing such hydrophobic materials, they should be free of water-solubilizing groups such as sulfo and carboxyl. In general, the dyes have excellent fastness, for example, to light, washing, gas (atmospheric fumes) and sublimation.

As described above, the present azo compounds are characterized by an imidoethylsulfonylethyl group. This distinctive structure imparts unexpected properties to the present azo compounds, especially when the azo compounds are used for dyeing textiles, including improved fastness to light and improved affinity for polyester fibers. Thus, the azo compounds of the invention can be expected to be superior to similar but distinct dyes when tested by methods such as described in the A.A.T.C.C. Technical Manual, 1964 edition, depending in part upon the particular dye used and the fiber being dyed.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,943,827. The following examples illustrate methods by which the azo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring until a fine emulsion is obtained. Water is then slowly added to a total volume of 200 cc., 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of the invention have varying utility as dyes. The degree of utility varies, for example, depending upon the material being dyed and the formula of the azo compound. Thus, for example, all the dyes will not have the same degree of utility for the same material. For example, the substituents on the R, R$^1$ and R$^2$ radicals, as mentioned above, serve primarily as auxochrome groups to control the color of the azo compound.

Polymeric linear polyester materials of the terephthalate type are illustrative of the linear aromatic polyester textile materials that can be dyed with the new disazo compounds of our invention. The terephthalate fibers sold under the trademarks "Kodel," "Dacron," and "Terylene," for example, in the form of filaments, yarn and fabric for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

Nylon, in fiber, yarn and fabric form, is representative of polyamides which can be dyed with the azo compounds.

The invention has been described in considerable detail with particular reference to certain preferred embodiments thereof, but it will be understood that variations and modifications can be effected within the spirit and scope of the invention as described above and as defined in the appended claims.

What we claim is:

1. A water-insoluble azo compound having the formula

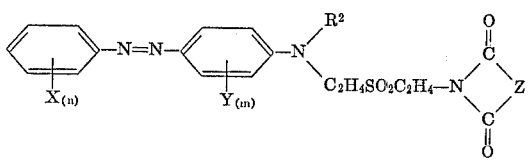

wherein
X represents lower alkyl, lower alkoxyl, chlorine, bromine, nitro, lower alkylsulfonyl, lower alkylsulfonamido, succinimido, trifluormethyl, lower alkanoylamino, cyano, carbamoyl, benzamido, thiocyano, lower alkythio, formyl, acetyl, lower carbalkoxy, sulfamoyl, or dimethylsulfamoyl;
n represents 0, 1, 2 or 3;
Y represents lower alkyl, lower alkoxyl, chlorine, bromine, lower alkanoylamino, lower alkylsulfonamido, lower alkylthio, or benzamino;
m represents 0, 1 or 2;
R$^2$ represents hydrogen; lower alkyl; lower alkyl substituted with hydroxy, lower alkoxyl, cyano, lower alkanoyloxy, lower carbalkoxy, chlorine, bromine, lower alkylsulfonyl, lower alkyl-OCOO—, carbamoyl, phenoxy, phenylcarbamoyloxy, succinimido, phthaimido, or lower alkylsulfonamido; benzyl; phenyl; or phenyl substituted with lower alkyl, lower alkoxy, chlorine, or bromine; and
Z represents alkylene of 2 or 3 carbon atoms; alkylene of 2 or 3 carbon atoms substituted with hydroxy, lower alkanoyloxy, cyano, chlorine, bromine, or methyl; vinylene; o-phenylene; 1,2-cyclopentylene; or 1,2-cyclohexylene.

2. A water-insoluble azo compound having the formula

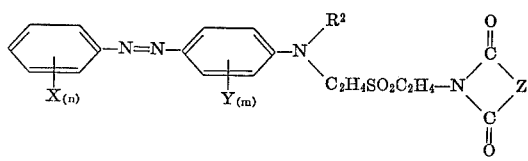

wherein
X represents nitro, chlorine, bromine, lower alkylsulfonyl, cyano, or trifluoromethyl;
n represents 1, 2, or 3;
Y represents lower alkyl, lower alkoxy, chlorine bromine, or lower alkanylamino;
m represents 0, 1, or 2;
R$^2$ represents lower alkyl or lower alkyl substituted with lower alkoxy, phenoxy, lower alkanoyloxy, chlorine, bromine, hydroxy, carbethoxy, or cyano; and
Z represents alkylene of 2 or 3 carbon atoms, vinylene, or o-phenylene.

3. A compound according to claim 2 wherein
X represents nitro, chlorine, bromine, methylsulfonyl, or cyano;
n represents 1, 2, or 3;
Y represents lower alkyl;
m represents 0 or 1;
R$^2$ represents lower alkyl or lower alkyl substituted with chlorine, bromine, hydroxy, or lower alkanoyloxy; and
Z represents ethylene or o-phenylene.

4. The dye:
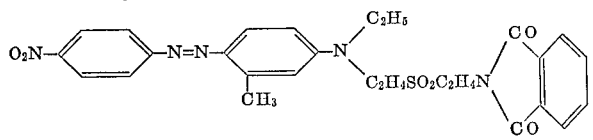
5. The dye:
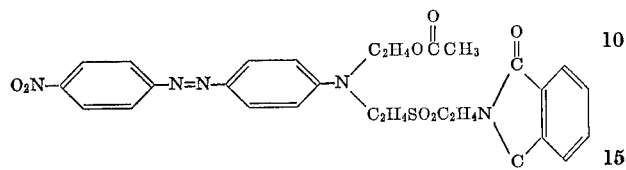
6. The dye:
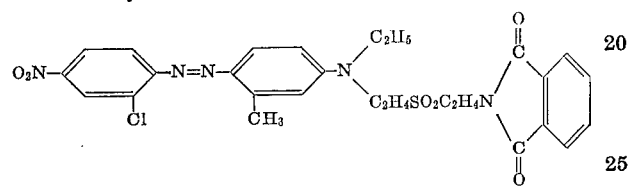
7. The dye:
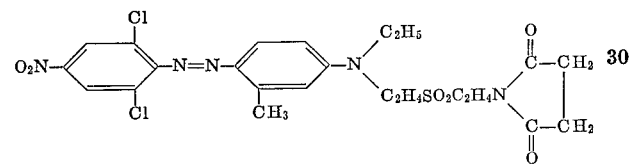
8. The dye:
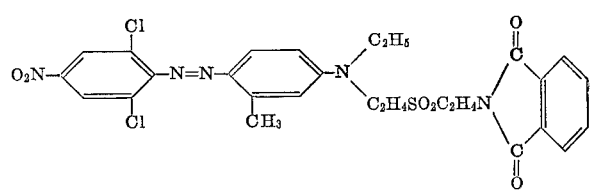
9. The dye:
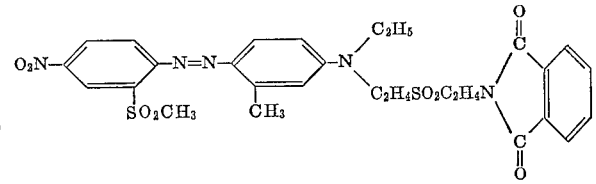
References Cited
UNITED STATES PATENTS
| | | | |
|---|---|---|---|
| 2,816,101 | 12/1957 | Breig et al. | 260— 152 XR |
| 3,096,322 | 7/1963 | Straley et al. | 260—152 XR |
| 3,148,178 | 9/1964 | Wallace et al. | 260—152 |
| 3,148,180 | 9/1964 | Straley et al. | 260—152 XR |
FLOYD D. HIGEL, *Primary Examiner.*